April 24, 1962  W. J. SIEGEL ETAL  3,030,833
PUNCHING AND RIVETING APPARATUS
Filed June 4, 1958  6 Sheets-Sheet 1

INVENTORS
WILLIAM J. SIEGEL
BY  JOHN J. WHITE

ATTORNEY

April 24, 1962 W. J. SIEGEL ETAL 3,030,833
PUNCHING AND RIVETING APPARATUS
Filed June 4, 1958 6 Sheets-Sheet 2
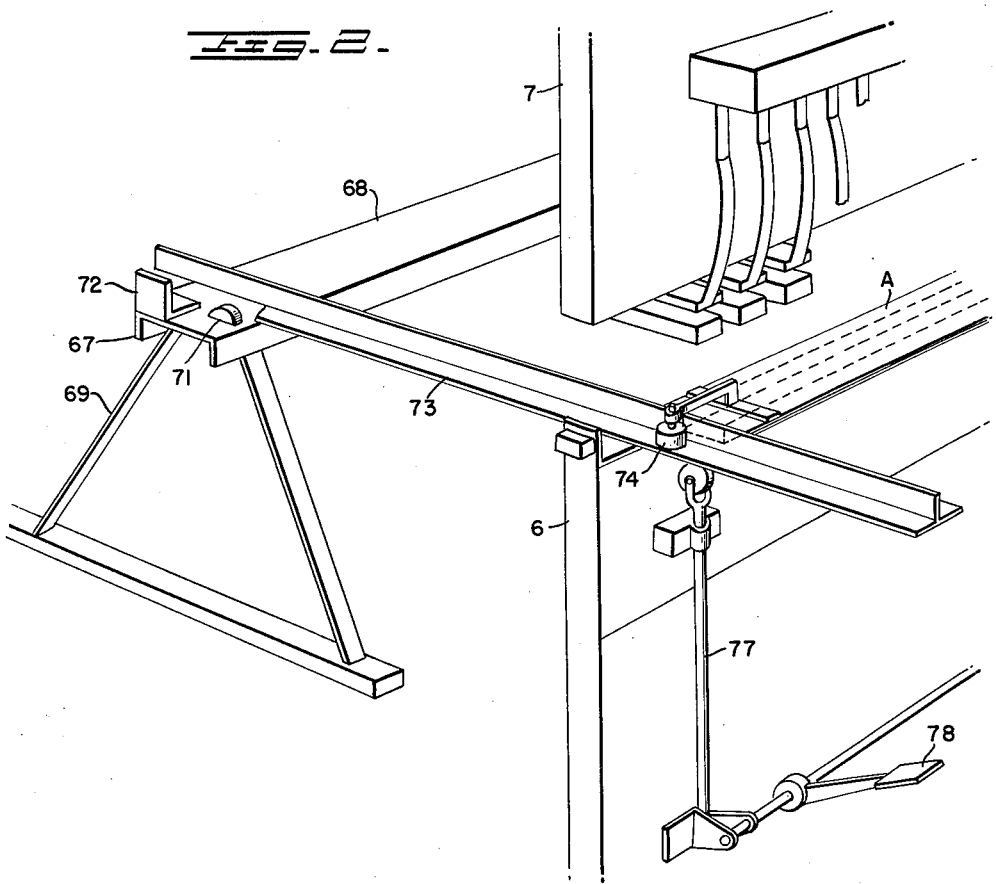
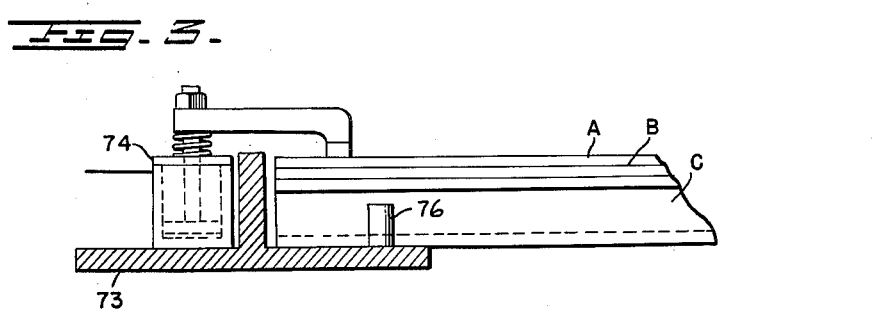
INVENTORS
WILLIAM J. SIEGEL
BY JOHN J. WHITE
ATTORNEY

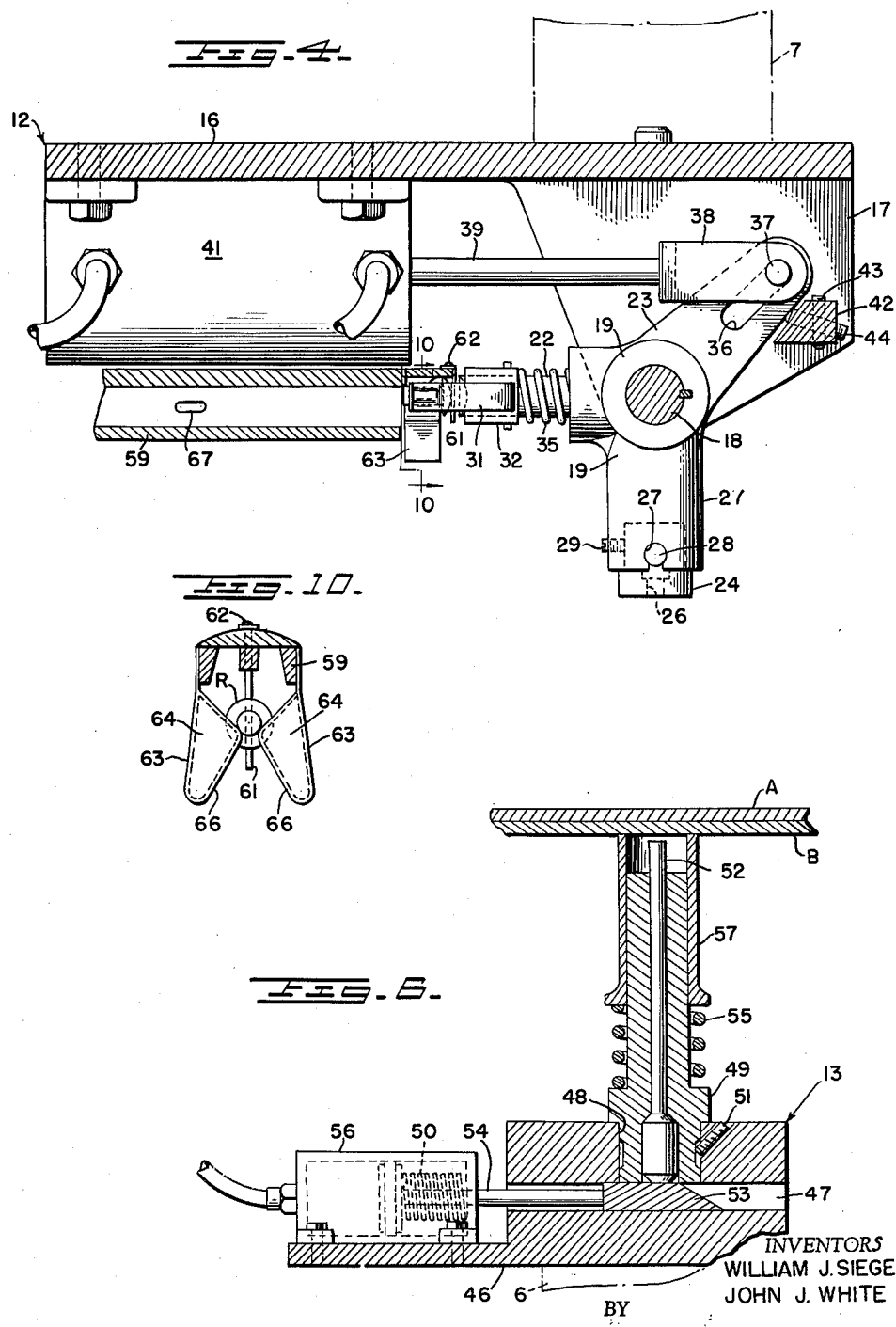

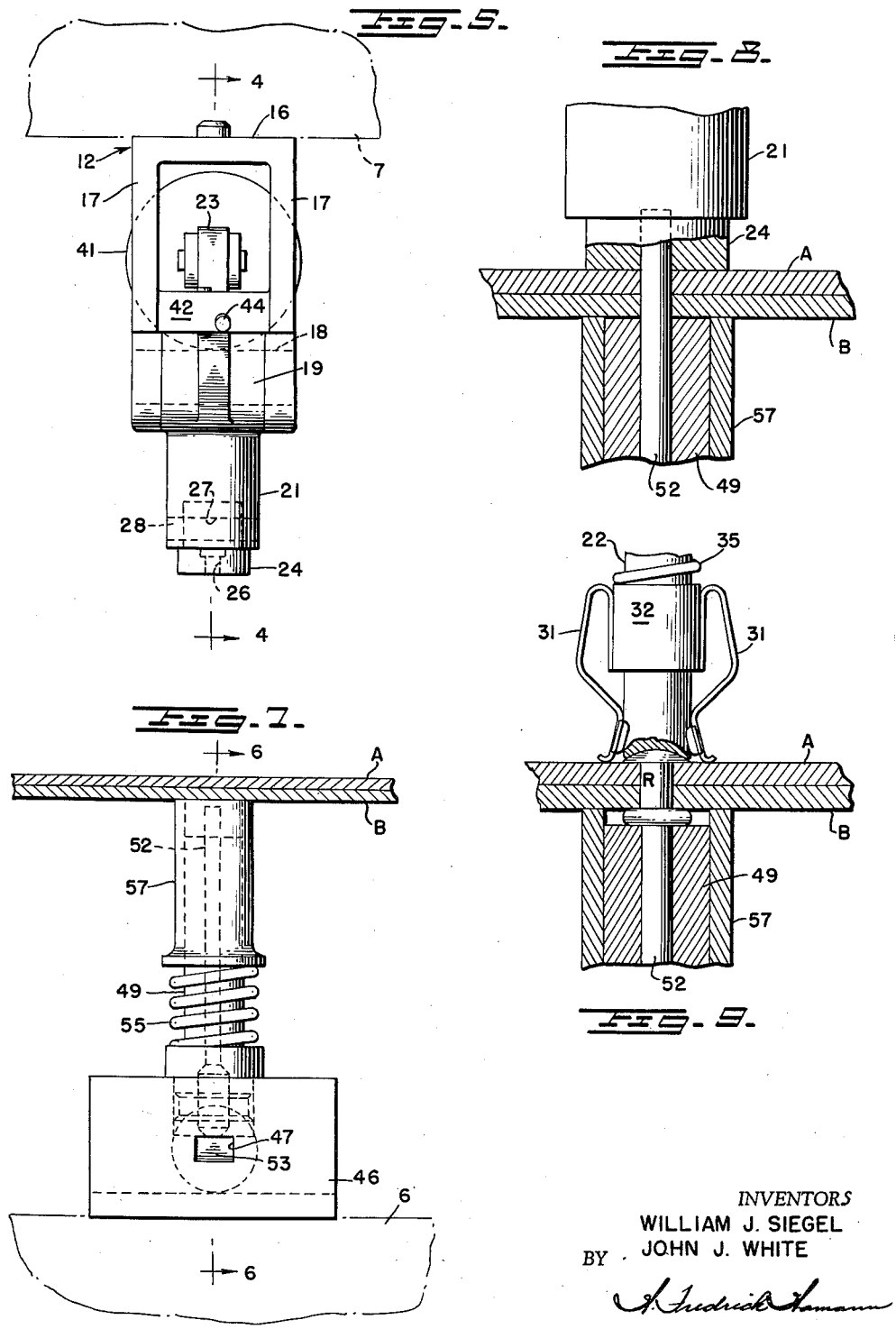

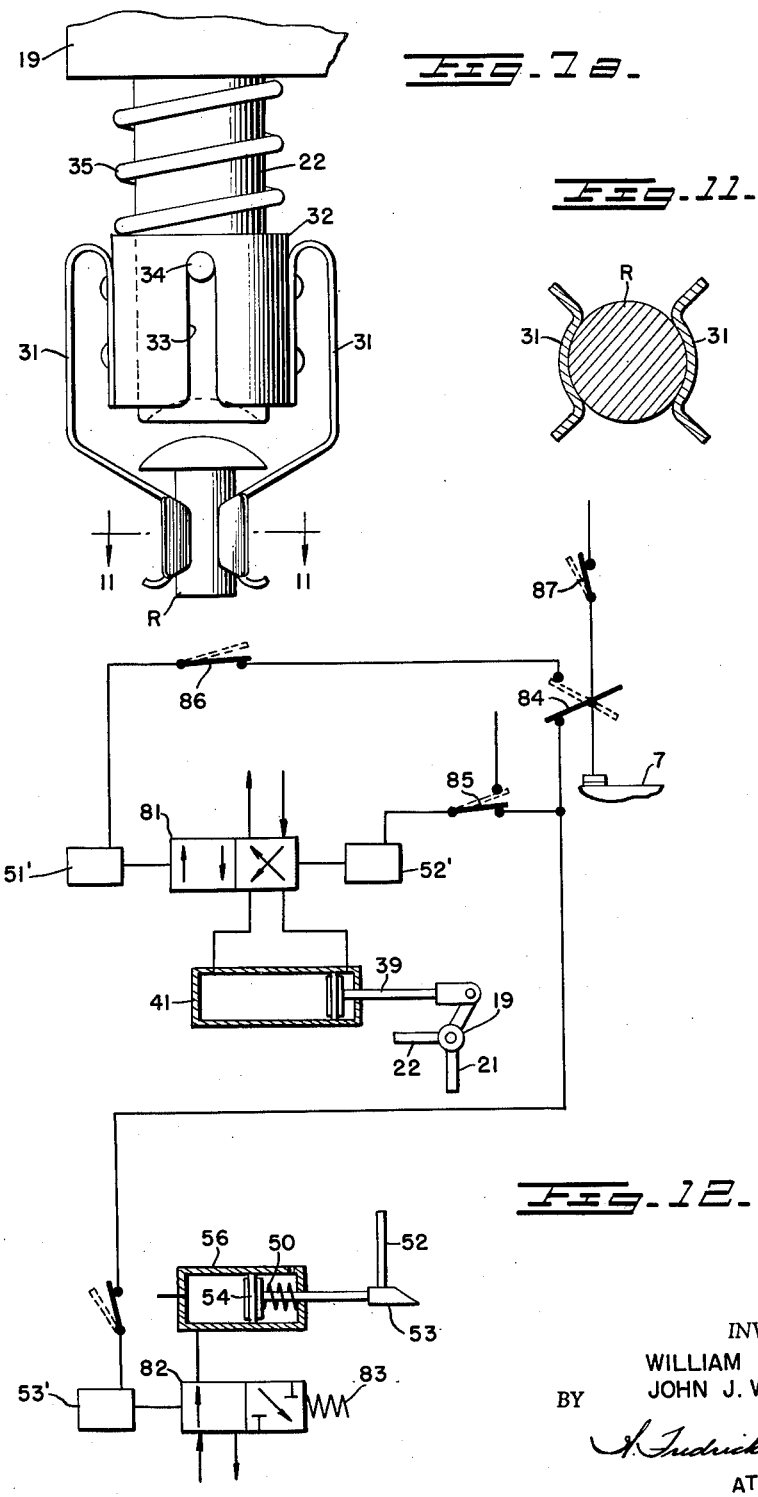

April 24, 1962   W. J. SIEGEL ETAL   3,030,833
PUNCHING AND RIVETING APPARATUS
Filed June 4, 1958   6 Sheets-Sheet 6
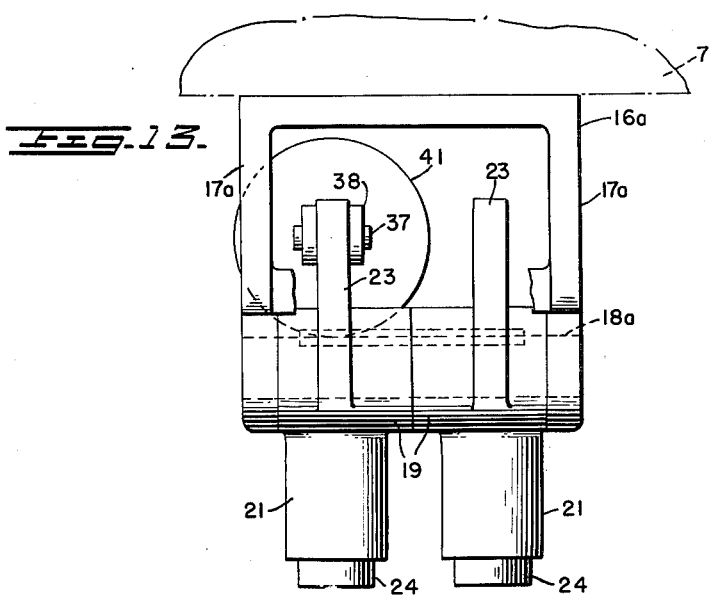
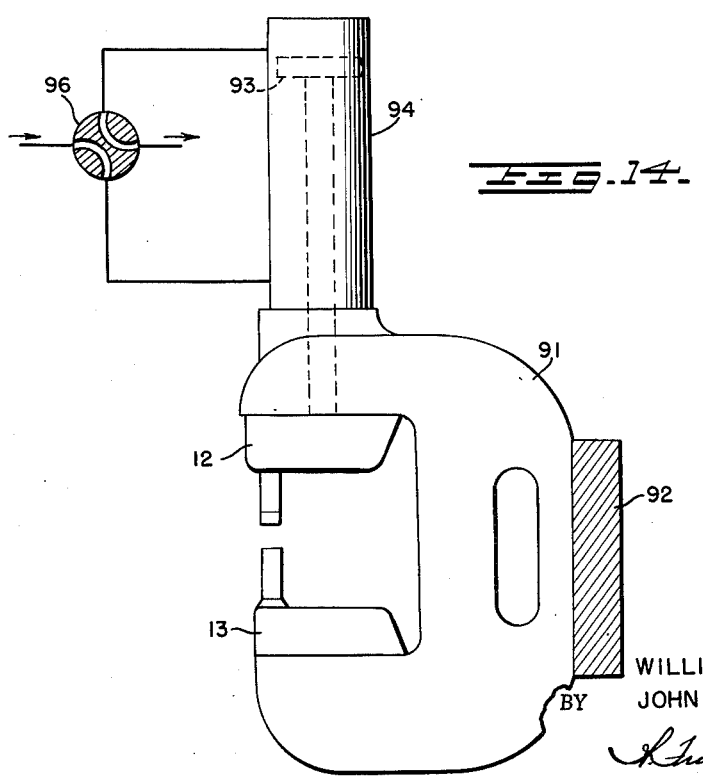
INVENTORS
WILLIAM J. SIEGEL
JOHN J. WHITE
BY
ATTORNEY United States Patent Office 3,030,833
Patented Apr. 24, 1962

3,030,833
PUNCHING AND RIVETING APPARATUS
William J. Siegel, Silver Spring, and John J. White, Bethesda, Md., assignors to ACF Industries Incorporated, New York, N.Y., a corporation of New Jersey
Filed June 4, 1958, Ser. No. 739,860
5 Claims. (Cl. 78—48)

This invention relates to punching and riveting apparatus and, more particularly, to apparatus adapted for use in the fabrication of large sheet metal assemblies, such as truck panels.

Heretofore, in the fabrication of large assemblies by a conventional punching and riveting machine, one rivet was inserted and heated in the workpieces during each operating cycle. As some large assemblies, such as truck panels, are fabricated with, for example, forty rows of rivets, with fifty rivets in each row, a conventional punching and rivetin machine would complete the assembly in two thousand punching and heading operations, and would require relocation of the workpieces after each heading operation.

Briefly, the present invention contemplates the provision of punching and riveting apparatus adapted for use in the fabrication of large sheet metal assemblies, such as truck panels, said apparatus embodying means for supporting and guiding the workpieces, means for simultaneously punching a row of holes in the workpieces, means for simultaneously inserting a row of rivets in said holes, and means for simultaneously heading the row of rivets. In the fabrication of a truck panel of the type described, a row of fifty rivets would thus be inserted and headed during each operation cycle of the apparatus, and it would only be necessary to move the workpieces forty times to apply the forty rows of rivets to the assembly.

An object of the invention resides in the provision of means for supporting and guiding a plurality of workpieces for step-by-step movements through the apparatus, and means for progressively applying rows of rivets to the workpieces.

Another object of the invention resides in the provision of means for simultaneously punching a row or pattern of rivet holes in workpieces, simultaneously inserting rivets in said holes, and then simultaneously heading the rivets.

A further object of the invention resides in the provision of a plurality of individual punching and riveting packs adapted to be adjustably positioned with respect to each other to apply rivets in rows or patterns to the workpieces.

Another object of the invention resides in the provision of a punching and riveting apparatus embodying a plurality of individual packs adapted to be operated simultaneously to punch a row or pattern of rivet holes, insert rivets in said holes, and then to head the rivets.

Another object of the invention resides in the provision of a punching and riveting apparatus provided with lockout means for preventing operation of selected punching and riveting packs.

Another object of the invention resides in the provision of individual punching and riveting packs provided with means whereby selected packs punch rivet holes in workpieces without inserting rivets therein for heading.

Another object is to provide an individual rivet pack comprising upper and lower heads coacting to punch rivet holes in workpieces, inserting rivets in said holes, and then heading the rivets.

Another object is to provide an individual rivet pack in which an upper head is provided a rivet set and a die, alternately movable into registry with coaxial punch, anvil and stripper members mounted on the lower head.

Another object is to provide a common support for the rivet set and die, means to move said support, and means for transferring rivets from a rivet feed mechanism to rivet retaining means on said rivet set during movement of said support.

Another object of the invention is to provide a rivet set and die on a pivotally mounted support, power means to pivot said support, and means to limit pivotal movement of the support.

Another object is to provide a punching and riveting apparatus comprising upper and lower carriers supporting upper and lower pack heads, respectively, and means to reciprocate said upper carrier relative to said lower carrier.

Another object of the invention is to provide means for actuating the rivet set and die support and the punch responsive to reciprocative movement of the upper carrier.

Another object of the invention is to provide a portable individual punching and riveting pack in which the upper and lower heads thereof are mounted on a common C-shape frame, and power means is provided on the frame to reciprocate the upper head.

Another object of the invention resides in the provision of individual punching and riveting packs adapted to be mounted on conventional sheet metal forming machines, such as press brakes, punch presses, etc.

The invention embodies other novel features, details of construction and arrangement of parts which are hereinafter set forth in the specification and claims and illustrated in the accompanying drawings, forming part thereof, wherein:

FIG. 2 is a fragmentary perspective view illustrating means for supporting and guiding workpieces to be punched and riveted.

FIG. 3 is a fragmentary detail view showing means for clamping workpieces in fixed position on the supporting means.

FIG. 4 is a sectional view taken along the line 4—4 of FIG. 5, showing the upper head of the punching and riveting pack.

FIG. 5 is an end elevation, showing the upper head.

FIG. 6 is a sectional view taken along the line 6—6 of FIG. 7, showing the lower head of the punching and riveting pack.

FIG. 7 is an end elevation, showing the lower head.

FIG. 7a is a detail view of the rivet set arm.

FIG. 8 is a fragmentary detail sectional view, illustrating the means for punching a rivet hole in workpieces.

FIG. 9 is a fragmentary detail sectional view, illustrating means for heading a rivet positioned in aligned rivet holes in the workpieces.

Figure 1:
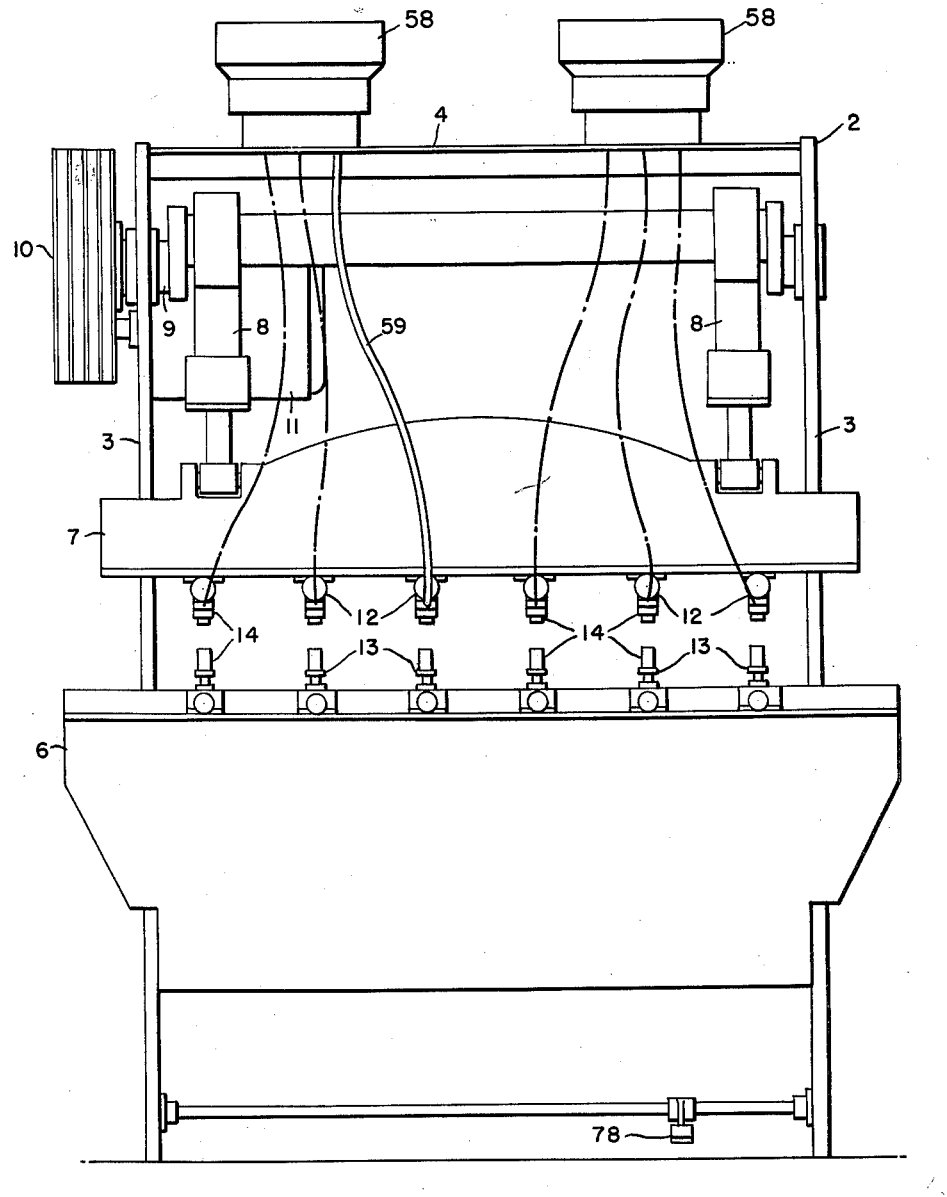
FIG. 1 is a front elevation showing a punching and riveting apparatus embodying features of the invention.

FIGS. 10 and 11 are sectional views taken along the lines 10—10 and 11—11, respectively, of FIGS. 4 and 7a.

FIG. 12 is a schematic view illustrating the control means associated with each individual punching and riveting pack.

FIG. 13 is an end elevation illustrating a modified form of the invention.

FIG. 14 is a side elevation, illustrating another form of the invention.

Referring now to the drawings for a better understanding of the invention and, more particularly, to FIGS. 1 to 10 therein, the punching and riveting apparatus is shown as comprising a frame 2 having end members 3—3 interconnected by top members 4 and a lower carrier member 6. An upper carrier member 7, guided for vertical reciprocative movement on the end members 3—3, is connected to the lower ends of connecting rods 8—8 which are journaled at their upper ends on eccentrics on a shaft 9. The shaft 9 is journaled at its ends in bearings provided on the end members 3—3 and is driven by an electric motor 11 through a conventional clutch and gear reduction unit 10, the clutch being of the single revolution type commonly employed on punch presses, press brakes and the like. It is contemplated that hydraulic means, such as conventional piston-cylinder assemblies, could be provided on the frame 2 to reciprocate the upper carrier member 7, as employed on hydraulic presses.

The upper and lower carrier members 7 and 6 are formed with flat opposing surfaces to receive upper and lower heads 12 and 13, respectively, of a plurality of identical individual punching and riveting packs, indicated generally at 14, said heads being secured to their respective carrier members by means of bolts or screws.

The upper head 12 is shown as comprising an elongated body 16 provided with spaced side walls 17—17 formed with axially aligned bearing apertures to receive opposite ends of a pivot pin 18. A tool support 19, secured on the pin 18 between the side walls 17—17, is formed with a die button arm 21, a rivet set arm 22, and an actuating arm 23, said arms being radially disposed about the pivoted axis of the support.

The die button arm 21 is formed with a recess to receive a hardened steel die button 24 having an axial opening 26 merging with a slug passage 27 which is in axial alignment with ports 28 in the arm, the button being secured in fixed position on the arm by a set screw 29. Rivet retaining fingers 31—31, formed of resilient strip metal, are secured to opposite sides of a sleeve 32 telescopically mounted on the rivet set arm 22 to engage and support a rivet R in axial alignment with the arm, the sleeve being formed with diametrically opposed slots 33 to receive the ends of a pin 34 mounted on the arm. A helical compression spring 35 is provided on the arm 22 to yieldably resist inward movement of the sleeve 32.

The tool support actuating arm 23 is formed with a slot 36 to receive a pin 37 mounted on a bifurcated member 38 secured on the end of a piston 39 which is mounted for reciprocative movement in a cylinder 41 secured to the body 16. As illustrated in FIG. 4, the piston 39 acts through the actuating arm 23 to alternately move the die button arm 21 and rivet set arm 22 into alignment with the line of travel of the upper carrier 7. A rib or web 42 extends between the side walls 17—17 and is provided with adjustable stop screws 43 and 44 to alternately engage the arms 21 and 23, respectively, to limit the pivotal movement of the tool support 19.

The lower head 13 of the punching and riveting pack is shown as comprising a body 46 having a square opening 47 and a cylindrical opening 48. An anvil 49, mounted in the opening 48 and secured to the body by a set screw 51, is formed with coaxial bores to receive a punch 52 for engagement by a cam 53 slidably mounted in the square opening 47. The cam 53 is connected to a piston 54 mounted in a cylinder 56 secured to the body 46, and a compression spring 50 is provided in the cylinder to yieldably resist movement of the piston. A stripper 57 is telescopically mounted on the anvil 49 for engagement by a helical compression spring 55 which acts to yieldably resist movement of the stripper toward the base during punching and riveting operations.

A rivet feed mechanism is shown as comprising a hopper 58 from which rivets R are delivered into and through a conduit 59 for abutting engagement against a resilient wire abutment finger 61 secured at 62 to one side of the conduit and extending transversely across the end thereof to engage the head portions of the rivets. After movement of a rivet against the abutment finger 61, the shank thereof is engaged between a pair of resilient support arms 63—63 secured at their upper ends to the conduit 59, the arms having inwardly converging walls 64—64 to guide the rivet therebetween, and upwardly converging walls 66—66 for engagement by the rivet retaining fingers 31—31. The conduit 59 is provided with an air nozzle 67 to direct a blast of air under pressure into and toward the outlet end of the conduit to move each rivet between the arms 63—63 and against the abutment finger 61.

The work supporting and guiding means, as shown in FIG. 2, comprises one or more work supporting tables 67, each having a top member 68 supported at its ends on legs 69 and provided with rollers 71 and guides 72 to engage T rails 73—73. Work pieces of sheet metal, such as panels A and B and posts C, are secured to the rails 73—73 by means of suitable clamping devices 74, as illustrated in FIG. 3. Pairs of locating pins 76 are provided on the rails to engage opposite sides of the posts. A manually operable lift mechanism 77 is provided to engage the T rails to raise the work pieces thereon for movement to a different position relative to the punching and riveting packs.

In the operation of the apparatus thus described, the work pieces are secured along their ends to the rails 73—73 and positioned between the upper and lower heads of the several punching and riveting packs 14. After the motor 11 has been started, the clutch pedal 78 is operated to actuate the single revolution clutch to turn the shaft 9 one complete revolution to thereby lower, raise and then stop the upper carrier member 7.

FIG. 12 illustrates schematically the means provided for controlling the operation of a single pack, whereby the work pieces may be punched and riveted, punched only, or not punched. Fluid is directed from a source of pressure into the cylinders 41 and 56 through spool valves 81 and 82, the valve 81 being controlled by solenoids 51′ and 52′, and the valve 82 being controlled by solenoid 53′ and spring 83. The solenoids are connected to a source of current through circuits controlled by a rotary switch 84, actuated by carrier 7, and manually operable switches 85, 86 and 87.

To punch and rivet workpieces A and B, the switches 84, 85, 86 and 87 are first disposed in their full line positions, as illustrated in FIG. 12, to energize the solenoids 52′ and 53′ which actuate their respective valves 81 and 82 to direct fluid under pressure into the cylinders 41 and 56, respectively, to thereby cause the piston 39 to move the die button arm 21 into axial alignment with the punch 52, and to cause the piston 54 to move the cam 53 into position to raise the punch 52. During pivotal movement of the tool support 19, the resilient fingers 31—31 move between the resilient arms 63—63 to engage a rivet R in the conduit 59. The clutch pedal 78 is then actuated to reciprocate the upper carrier 7 to cause the punch 52 to coact with the die button 24 to punch a rivet hole through the workpieces. During the upward stroke of the carrier 7, the spring 55 acts through the stripper 57 to strip the workpieces from the punch 52.

As the carrier 7 approaches the upper end of its stroke, it actuates the rotary switch 84 to move the switch blade from its full line position to its dotted line position, to thereby de-energize the solenoids 52′ and 53′, and to energize the solenoid 51′. The spring 83 then acts to move the valve 82 into position to discharge fluid from the cylinder 56, and the spring 50 acts through the piston 54 to move the cam 53 out of engagement with the punch 52 to retract the latter to its rivet heading position, as illustrated in FIG. 9. The solenoid 51′ then moves the valve 81 to direct fluid under pressure into the cylinder 41 to cause the piston 39 to pivot the tool support 19 to move the rivet set arm 22 and rivet R thereon into alignment with the punch 52. By actuating the clutch pedal 78, the upper carrier 7 is reciprocated to insert the rivet in the rivet aperture, head the rivet, as illustrated in FIG. 9, and is then returned to its raised position. During the return stroke, the upper carrier 7 actuates the rotary switch 84 to de-energize the solenoid 51′ and energize the solenoids 52' and 53'. The solenoid 52' actuates the valve 81 to direct fluid into the cylinder 41 to cause the piston 39 to pivot the die button arm 21 to align with the punch 52. The solenoid 53' actuates the valve 82 to direct fluid into the cylinder 56 to cause the piston 54 to move the cam 53 under the punch 52. The workpieces A and B are then moved to a different position for a second punching and riveting operation.

By providing individual control means for the several packs 14, it is possible to set up some packs to punch and rivet the workpieces, while other packs may be either rendered inactive or set up to punch only. To render a pack inactive, the switches 85, 86 and 87 are moved to their dotted positions, as illustrated in FIG. 12, to energize the solenoid 52' which acts to maintain the die button arm 21 in alignment with the punch 52 which is maintained in its retracted position by means of the spring 50.

To set up a pack to punch only, while other packs are set up to punch and rivet, the switches 85 and 86 are moved to their dotted positions, whereby the die button arm 21 is maintained in alignment with the punch 52, while the cam 53 is alternately moved into and out of engagement with the punch by the operation of the rotary switch 84.

Each of the several packs may also be set up to punch holes in workpieces on each stroke of the carrier 7, by moving the switches 85 and 88 to their dotted positions to energize their respective solenoids 52' and 53' and maintain the die button arm 21 and punch 52 in their hole punching positions.

FIG. 13 illustrates the manner in which a plurality of tool supports 19 may be keyed to a common pivot pin 18a journaled in an upper head body 16a, one of the tool supports having a connection 38 to the operating piston 39. This form of the invention is otherwise similar to the form heretofore shown and described.

FIG. 14 illustrates another embodiment of the invention wherein the upper and lower head 12 and 13 of a pack 14 are provided on a C-shaped frame 91 adapted to be mounted on a suitable support 92, either alone or with other packs. In this form of the invention, the lower head 13 is secured to the frame 91, and the upper head 12 is secured to a piston 93 which is mounted in a cylinder 94 secured to the frame. To reciprocate the piston 93, pressurized fluid is directed into the cylinder 94 under control of a valve 96. By mounting the rotary switch 84 on the frame 91 for engagement by the upper head 12, the operation of the rivet pack may be controlled by the means disclosed in FIG. 12.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a punching and riveting apparatus, upper and lower carrier members, power means moving one of said carrier members towards the other carrier member, upper and lower heads carried by said carrier members, aligned bearings mounted on one of said heads, a pivot pin mounted in said bearings, a tool support mounted on said pivot pin, said tool support including a die-button arm and a rivet set arm radially projecting from said pivot pin and arranged at 90 degree angles about its axis, said tool support being provided with a radiating operating arm, said operating arm having its center line projecting through the axis of the pivot pin and projecting medially of the die-button arm and the rivet set arm, said operating arm being formed with an elongated slot, a reciprocating member having a sliding connection at one end in said slot, a motor for actuating said reciprocating member, means for mounting said motor, and a second fixed head carried by said other carrier member comprising a punch and anvil, said punch and anvil being normally positioned for alignment with one or the other of said arms of said tool support when the latter are shifted to alternate positions on their pivotal support by said reciprocating operating arm, motor means for actuating said punch, and means operated by the said movable carrier member for synchronizing the operation of said motors.

2. The structure of claim 1 characterized in that the second head is provided with an opening which receives said anvil therein and is formed with a coaxial bore for receiving said punch, sliding cam means being provided for actuating said punch.

3. The structure of claim 1 characterized in that the second head is provided with an opening which receives said anvil therein and a transversely extending slot for the travel of a cam, the opening in the anvil being provided with a coaxial bore for receiving a punch which is operated by said cam.

4. In a punching and riveting apparatus, upper and lower carrier members, power means moving one of said carrier members towards the other carrier member, upper and lower heads carried by said carrier members, aligned bearings mounted on one of said heads, a pivot pin mounted in said bearings, a tool support mounted on said pivot pin, said tool support including a die-button arm and a rivet set arm radially projecting from said pivot pin and arranged at different angles about its axis, said tool support being provided with a radiating operating arm, said operating arm having its center line projecting through the axis of the pivot pin and projecting medially of the die-button arm and the rivet set arm, said operating arm being formed with an elongated slot, a reciprocating member having a sliding connection at one end in said slot, a motor for actuating said reciprocating member, and means for mounting said motor.

5. The structure of claim 4 characterized in that the rivet set arm when in one position is associated with a rivet delivery conduit, said conduit being provided with an abutment finger for limiting the travel of the rivet and said rivet set arm being provided with retaining fingers for holding the rivet delivered from the conduit.

References Cited in the file of this patent

UNITED STATES PATENTS

| | | |
|---|---|---|
| 1,355,363 | Shaw | Oct. 12, 1920 |
| 1,898,468 | Tapman | Feb. 12, 1933 |
| 2,063,691 | Marchant | Dec. 8, 1936 |
| 2,069,042 | Marchant | Jan. 26, 1937 |
| 2,340,552 | Mortl | Feb. 1, 1944 |
| 2,349,529 | Ward | May 23, 1944 |
| 2,620,876 | Harness | Dec. 9, 1952 |